March 4, 1941.　　F. CONRAD　　2,233,586
AUTOMOTIVE GENERATING SYSTEM
Filed Sept. 21, 1938　　3 Sheets-Sheet 3

WITNESSES:

INVENTOR
Frank Conrad.
BY
ATTORNEY

Patented Mar. 4, 1941

2,233,586

UNITED STATES PATENT OFFICE 2,233,586

AUTOMOTIVE GENERATING SYSTEM

Frank Conrad, Wilkinsburg, Pa., assignor to Westinghouse Electric & Manufacturing Company, East Pittsburgh, Pa., a corporation of Pennsylvania Application September 21, 1938, Serial No. 230,981

17 Claims. (Cl. 171—314)

This application is a substitute for, and a continuation-in-part of, my application Serial No. 166,605, filed September 30, 1937.

My present invention relates to automotive generating systems and particularly to a polyphase generator and to a polyphase generator-and-rectifier combination which is particularly suitable for automobile battery-charging systems.

My present invention is an improvement over a battery-charging system which constitutes the subject-matter of Patent No. 2,117,018, granted May 10, 1938, to Gilbert C. Goode and myself, and it is also an improvement over a double-winding generator and rectifier combination which constitutes the subject-matter of my Patent No. 2,117,019, granted May 10, 1938. The aforesaid patents relate to a high-frequency battery-charging system for an automobile or other self-propelled transportation-device, said system utilizing an inductor-type single-phase generator having a small-span stator-member disposed at one point in the circumference of a toothed wheel which is of a diameter corresponding approximately to a diameter suitable for a flywheel, or a combined flywheel and clutch mechanism, for the prime mover of the self-propelled transportation-device.

In view of the extremely large numbers of automobiles on which such a battery-charging system is to be applied, it is urgently required that the size, and therefore the cost, shall be reduced to an absolute minimum. In attempting to work with a reasonably small air-gap, and a reasonably high magnetic induction, in order to obtain a high output in a small space, the element of noise became very objectionable, and my present invention has, for a principal object, the provision of design-features for reducing the noise to a point where it is not noticeable in the complete installation.

In my early studies on noise-reduction, in this type of generator, I tried various changes, to see if said changes would reduce the noise, comparing the noise of the altered machine with the noise obtained before the alteration. These methods did not yield the best solution to the noise-problem, because of the extremely complicated causes which produce noises, so that, if only one of these noise-producing causes is remedied, the salutary effect of the change may be masked by other noises, or the benefits might inadvertently be more than counterbalanced by unconscious changes in other factors which unknowingly actually increased the noise. It was only after much painstaking work, many unfruitful trials, and much study and analysis of segregated noise-producing causes, that I was able to obtain a generator having the required quietness of operation.

I have found, in small-span stator-designs, that there was a serious inevitable amount of noise accompanying every effort to utilize a single-phase source of alternating-current supply, which is due to the pulsations in the retarding torque produced by the single-phase load on the generator, and hence I found it necessary to go to a polyphase output. It is, of course, apparent that the resultant torque will become smoother as the number of phases is increased. I have found, in actual practice, that the use of three phases substantially eliminated the element of noise which is due to intermittent torque, although any polyphase design may be utilized.

The problem of noise due to teeth-interaction is considerably more complicated, because of design-limitations, and the extremely large number of factors involved.

If a model generator is built, in which the rotor-member has any desired tooth-formation, but in which the stator-member has no teeth and no alternating-current winding, it will be found necessary, for quiet operation, to cause the leading and lagging tips of the stator pole-piece to be further away from the rotor-member than the central portion of the stator pole-piece, so that the air gap is larger at the tips. This decreases the noise-impulse produced by the movement of the rotor teeth under and away from the stator pole-tips. The noise here involved has a pitch determined by the peripheral velocity of the rotor, divided by the pitch of the rotor-teeth. An improvement is also obtained by making the air gap slightly larger on the trailing end of the stator pole-piece as compared to the leading end.

If we provide the stator-member with a relatively large number of teeth, such as would be suitable for carrying an alternating-current winding which is to be responsive to tooth-flux pulsations, it will be found that noise will be produced, and that this noise is at a pitch determined by the peripheral velocity of the rotor, divided by the pitch of the stator-teeth, regardless of the pitch of the rotor-teeth.

I have found, in automobile installations, that the most troublesome sounds are those of low pitch, because the high-pitch notes are highly attenuated in volume by the usual sound-proofing methods which are in use in ordinary automobile body-construction. These sound-proofing methods usually consist of various mixtures of felt, combined with adhesives such as a tarry compound, which are sprayed over the inside surfaces of the body-paneling, flooring, frame, and other parts. As the pitch of the generator-sounds decreases, due to decreasing engine-speed, these generator-sounds finally become objectionable, and this critical pitch lies somewhere in the region of 500 cycles per second, although it is contemplated that the particular pitch would vary considerably in different installations. An object of my invention is, therefore, to have the stator-teeth so close together that the fundamental sound-pitch lies somewhere in the region of 500 cycles per second, or more, at the idling speed of the prime mover or engine.

In order to produce a quietly operating unit, I have found it necessary to utilize as narrow a slot as possible, and as many slots as possible, in the small-span stator-member, which means a large number of stator-slots in order to hold the necessary copper, each stator-slot being only wide enough for a single winding-conductor with necessary insulation. This results in a stator-member which presents substantially a continuous or unbroken pole-face to the rotor member.

To further reduce the noise-effects of the stator-teeth, I have found it advantageous to round off the edges of the rotor-teeth, so that the magnetic approach of each rotor-tooth to the stator-teeth would be smoothed out.

I have also found it advantageous to utilize a relatively large number of rotor-teeth, while keeping approximately 2N stator-teeth in the span of one rotor tooth-pitch, N being the number of phases, as this raised the pitch or frequency of the noise, and reduced the intensity of the noise which would be transmitted through the sound-proofing which is ordinarily embodied in an automobile body.

A practical limit to the possible increase in the number of rotor-teeth and in the number of phases is reached in the minimum size of stator-slot which will receive a conductor of the necessary current-carrying capacity, with its concomitant insulation, and by the necessity for a sufficiently large aggregate width of all of the stator-teeth to carry the necessary flux economically, that is, without an objectionable saturation. As the stator slot-width is reduced, it is necessary for the number of stator-slots to be increased in greater proportion than the reduction in the width, because of the greater number of thicknesses of insulation which are required, in the larger number of slots, for a given aggregate cross-section of copper, so that there is a practical limit beyond which it is not economical to reduce the width of the stator-slots or the width of the stator-teeth. I have found that there exist certain practical design-limits which can be properly chosen, whereby almost complete noise-elimination is achieved, with an economical electrical design, as I shall point out hereinafter.

At the same time that I was working on noise-reduction or elimination, I was working on means for obtaining an increased output for a given noise, a given size, and a given current-input into the magnetizing or field winding of the generator, thus permitting a reduction in either the size or the field-current, for a given output, without objectionable noise. The reduced field-current is desirable in order to give a greater reliability of the regulator-contacts which are commonly utilized in modern automobile battery-charging systems in order to prevent harmful overcharging of the battery. I found that the use of a three-phase unit was the major factor in increasing the output of the old single-phase generating unit, as I found that each of the individual phases of a three-phase winding had approximately the same output as if only a single-phase winding had been utilized, so long as the larger number of slots required by the three-phase winding does not materially reduce the total flux. Therefore, a three-phase unit will give very nearly three times the output of a single-phase unit.

In order to wind a small-span polyphase stator of the type hereinabove discussed, it is necessary to have fewer conductors in the slots at the extreme ends of the stator-member, which, in turn, generally necessitates more serially connected conductors in one phase than another, in order that the voltages generated in the different phases may be approximately equal, so that there will be equal loading. Thus, in operation, there are sometimes, say, six rotor-teeth under the stator-member, each tooth carrying approximately one-sixth of the stator-flux, while at other times there will be one more rotor-tooth, say seven, and each tooth would then tend to carry one-seventh of the total flux if the air-gap were the same at all points. According to my invention, however, the air-gap is taperingly increased, for the last few teeth at each end of the small-span stator-member, thus maintaining a more constant flux for the five centrally disposed rotor-teeth, eliminating one more source of noise, and assisting in maintaining approximately the same generated voltage in each phase of the polyphase winding.

A further noise-reducing expedient is to utilize stator-teeth that are slightly closer together (or further apart) than an even multiple of the rotor-teeth. Thus, if there are to be 41 stator-teeth in stator pole-face, I prefer to make the pole-face slightly narrower and place the 41 teeth a little closer together. In a three-phase generator, with approximately six stator-teeth to each rotor-tooth, a slight crowding together of the stator-teeth by ½ tooth-distance in the 41 teeth causes the six rotor-teeth that are underneath the stator pole-face to come under the successive stator-teeth at staggered intervals, instead of all together, thus materially reducing the amplitude of the fundamental noise-note, while introducing a weak, inaudible harmonic of approximately 82 times the frequency. At the same time, less than 1 percent is lost in the output-voltage by reason of the resultant chording. If the pole-face had been shortened by 1 tooth instead of ½ tooth, the noise might have been slightly further reduced, and the loss by chording would have approached 6 percent. Still further chording could be utilized if desired.

In certain generator-designs, according to my invention, in which the generator output has been pushed to a high value, by reducing the air gap and increasing the magnetic field-strength, I have found that there still remained a certain noise which is objectionable when the engine is idling at a certain critical speed, even though all of the preceding noise-reducing expedients have been utilized to their fullest practicable extent. At this critical low idling speed, the generator is not producing sufficient voltage to charge the battery, but the noise seems to be produced, nevertheless, as a result of the successive magnetic pulls between the rotor-teeth and the stator-teeth, this noise being of a sufficiently low pitch so that it is not adequately attenuated by the sound-proofing of the car. In normal operation, the generator, under these conditions, would be producing a voltage which, when rectified by the rectifier, is a little lower than the battery-voltage, and this rectified generator-voltage would be utilized for exciting the generator-field. In normally designed installations, a suitable reverse-current relay, such as is known in axle-generator battery-charging systems for railway-car lights, would be utilized for connecting the rectified generator-voltage to and from the storage battery at suitable times, so as to permit the generator to charge the battery when the generator-voltage is high enough for that purpose, while preventing any material reverse-current flow from the battery into the generator when the generator-voltage is low.

It is an object of my invention to overcome the objectionable noise, when encountered at a critical idling speed, as above mentioned, by providing an extra contact on the reverse-current or cut-out switch. I utilize this extra contact for inserting a resistance in series with the generator field when the generator is not charging the battery. The effect of this field-resistance is to reduce the magnetic induction, and hence the noise, at the critical idling speed, at the expense of increasing the speed at which the rectified generator-voltage, with the decreased excitation, becomes slightly greater than the battery-voltage. Usually, however, this slight delay in the commencement of battery-charging, as the automobile accelerates, is not at all objectionable, because the cutting-in speed of the generator is still well below any ordinary cruising speed of the automobile, so that the automobile would not be traveling at the intermediate speeds for any material length of time.

With the foregoing and other objects in view, my invention consists in the parts, elements, combinations, systems and methods hereinafter described and claimed and illustrated in the accompanying drawings, wherein:

Figure 1:
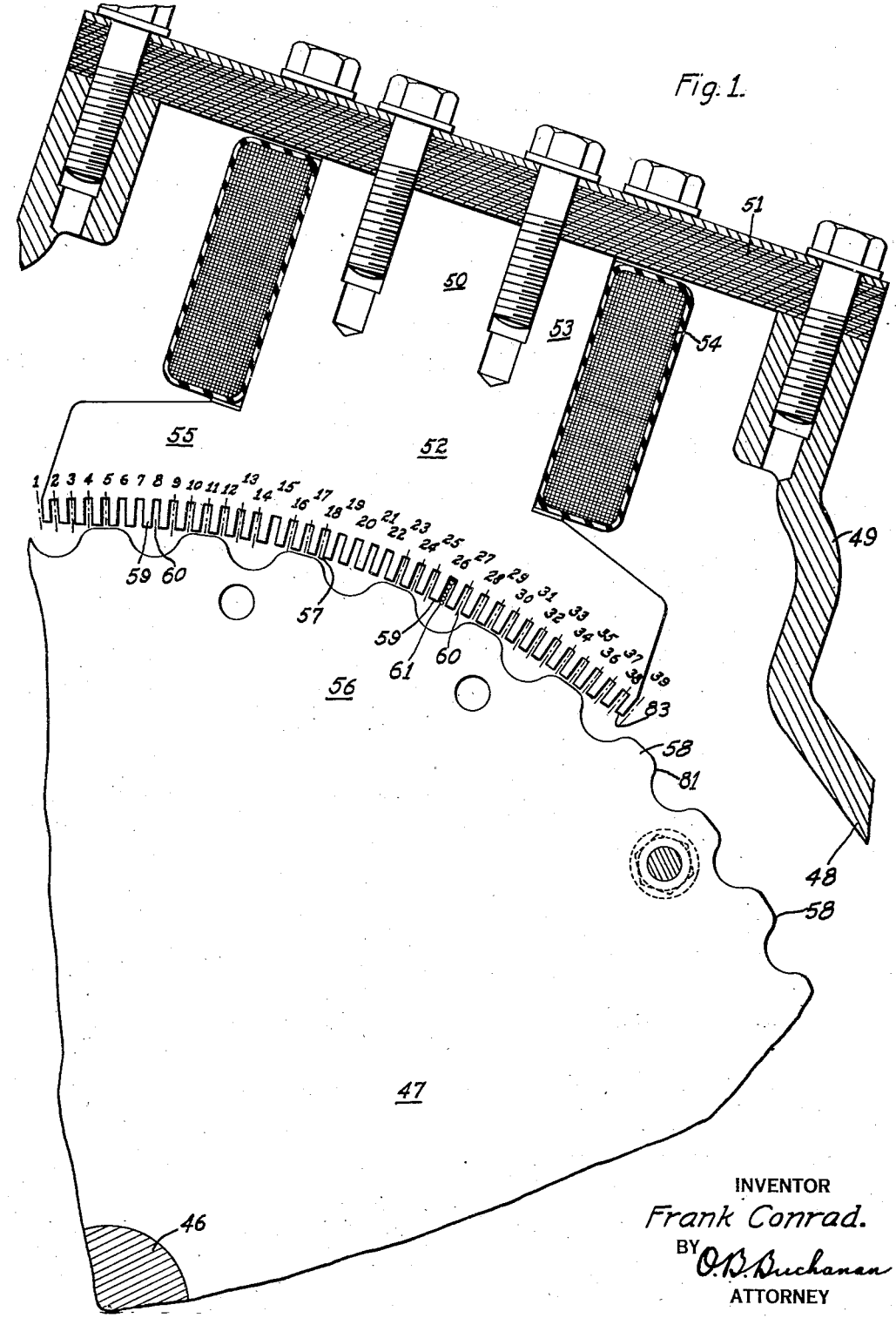
Figure 1 is a vertical sectional view through a generator embodying my invention, showing the same applied to the flywheel and clutch casing of an automobile, most of the generator-winding being omitted to better show the construction.

Figure 1 shows the shaft 46 of a prime mover of an automobile or other self-propelled transportation-device, a flywheel 47 carried by said shaft, and a clutch-casing 48 which substantially encloses said flywheel and the associated clutch-parts (not shown) for driving the propelling-means of the transportation-device. The clutch-casing 48 has a small portion 49 thereof which bulges away from the flywheel 47, so as to provide a pocket for receiving the stator-member 50 of my invention.

The stator-member 50 comprises a laminated magnetizable back-plate 51 which is bolted to the bulged portion 49 of the casing 48, and a single-pole laminated, magnetizable, pole-member 52, having a shank-portion 53 which carries a magnetizing or field winding 54, and having an enlarged pole-face portion 55 which cooperates with a rotor-member 56, being spaced therefrom by a small air-gap 57. The rotor-member 56 comprises a bunch of laminations of magnetizable material, disposed in an annular formation carried by the flywheel 47. As shown, the stator pole-member 52 spans only a very small portion (12.7%, to be exact) of the circumference of the rotor-member 56. The rotor-member 56 is provided with teeth 58 extending all the way around the periphery of said rotor-member. The air-gap surface of the stator-member is provided with teeth 59 placed much closer together than the rotor-teeth, and separated by slots 60 which receive the armature winding 61, most of the armature winding being broken away, in Fig. 1, for clarity of illustration.

For convenience in reference, each of the stator-slots 60 is separately numbered, treating the space outside of the last stator-tooth 59, at each end of the stator, as a slot, so that there are thirty-nine slots, which have been numbered consecutively 1 to 39, there being thirty-eight stator-teeth. The generator winding 61 is applied to the stator-teeth in such manner as to utilize the high-frequency tooth-flux pulsations caused by the movement of the rotor-teeth 58 past the stator-member, causing the flux traversing each coil-side of the winding 61 to change from a maximum, when a rotor-tooth is opposite the corresponding stator-slot, to a minimum when a rotor-slot or gap is opposite the corresponding stator-slot.

In order that the stator-coils may generate electromotive forces corresponding to the flux-pulsations caused by the rotor-teeth, which is characteristic of inductor-type generators, each stator-coil of the form of embodiment shown in Fig. 1 has two coil-sides which are placed in slots lying 180 electrical degrees apart, so that one slot will be over the center of a rotor-tooth 58 at the same instant when the other slot of the coil lies over the center of a rotor-valley. This gives a full-pitch winding, which gives the greatest output, particularly when the number of winding-slots 60 per pole-pitch of the rotor is small. In the present case, this number is six or, in general, 2N, where N is the number of phases, the factor 2 being involved because each coil has two sides. This is the minimum possible number of stator-teeth, and it is, in general, uneconomical to utilize a larger number of stator-teeth per rotor tooth-pitch, because of the necessity for having a stator-slot which is wide enough to accommodate a single winding-conductor with the necessary insulation, and a stator-tooth which is wide enough to carry its proportion of the flux, the space-factor being deleteriously affected if the number of stator slots is increased too greatly.

It is also desirable, from the standpoint of noise-elimination, to utilize as many rotor-teeth 58 as possible, so that, for a given overall length of stator, it is desirable to place as many teeth and slots therein as considerations of a practical space-factor will permit, and this will determine the number of rotor-teeth which should be utilized, so that each rotor tooth-pitch, or distance from the center of one tooth to the center of the next tooth, corresponds to 2N stator tooth-pitches.

Figure 2:
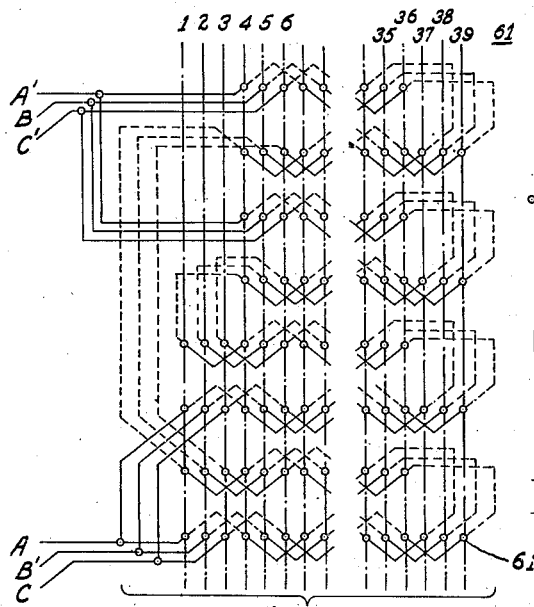
Fig. 2 is a developed wiring diagram of the polyphase stator winding embodied in a preferred form utilizing two Y-connected windings in parallel.
Figure 4:
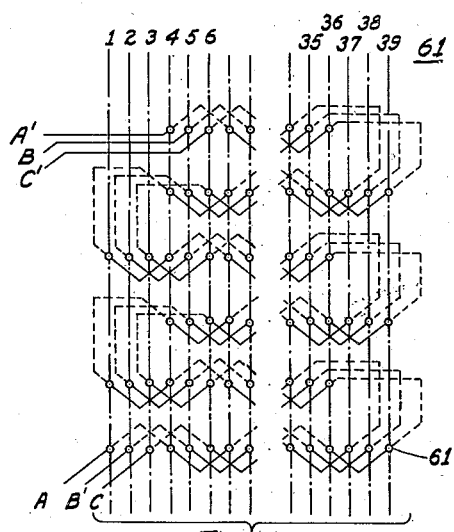
Fig. 4 is a view similar to Fig. 2 showing a less expensive winding than Fig. 2, having somewhat inferior electrical qualities, utilizing a single delta-connected winding.

A diagrammatic development of the thirty-nine stator slots 1 to 39 is shown in Figs. 2 and 4, embodying two different winding-arrangements, with the winding-conductors 61, widely separated in a vertical direction, so that the end-connections can be conveniently illustrated, the front end-connections being shown in full lines, and the rear end-connections in dotted lines. For convenience in illustration, in Figs. 2 and 4, only the beginning and ending of the winding is shown, the middle four poles of the entire six and one-half rotor-pole spans being omitted as being merely duplicates of the portions of the winding which are shown, as will be readily understood.

The particular form of stator-punching 52 shown in Fig. 1 was adapted to receive six winding-conductors or sides 61 per slot, corresponding to the winding shown in Fig. 4, but somewhat better electrical performance is obtained by using eight wires per slot, instead of six wires per slot, as indicated in the winding shown in Fig. 2.

The winding shown in Fig. 2 is a double-star winding, that is, it is a Y-connected three-phase winding having two conductors in parallel for each phase. The three terminal leads of the three phases are indicated at A, B and C, which may be regarded as the beginning points of each of the phase-windings, in which case, the ending-points of the said windings are those which are marked by the reference characters A', B' and C', respectively. As will be seen in Fig. 2, the winding is a full-pitch winding, having four turns in series, under each of the poles, for each of the two parallel-connected windings. In order to compensate for the fact that the winding-conductors lying in the lowermost positions in the slot 1 to 39, being the furthest away from the air-gap 57, have a somewhat less induced electromotive force than the other winding-conductors, due to leakage, the two parallel windings are arranged so that one circuit embodies the conductors lying in the two top layers and the two bottom layers, whereas the other circuit embodies the conductors lying in the four intermediate layers.

Figure 3:
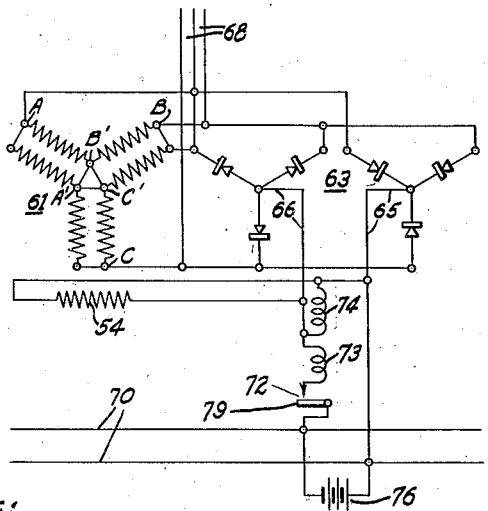
Fig. 3 is a diagrammatic view of circuits and apparatus illustrating a practical application of the generator shown in Fig. 2 in an automobile battery-charging system.

As shown in Fig. 3, the winding of Fig. 2 is connected in double star, with the points A', B' and C' connected together to constitute the common star-point. The terminal conductors A, B and C are utilized to supply a high-frequency polyphase current to a double star-connected full-wave rectifier 63, the two star-points of which constitute the direct-current terminals 65 and 66, respectively. Any desired form of rectifier 63 may be utilized: I prefer, however, to utilize a copper-oxide contact-rectifier such as constitutes the subject-matter of my application Serial No. 166,606, filed September 30, 1937, Patent No. 2,117,020, granted May 10, 1938.

It is also possible to supply a polyphase load from the terminals A, B and C as indicated by the branch-circuit 68.

Figure 5:
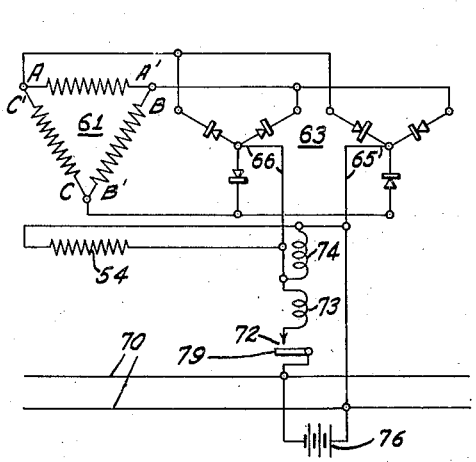
Fig. 5 is a view similar to Fig. 3 illustrating an application of the winding shown in Fig. 4.

The winding 61, in the form shown in Fig. 4, is adapted to be connected in delta rather than in star, and in this case each phase must supply more voltage and less current than in the star-connected winding of Figs. 2 and 3, as will be self-evident. Therefore, the delta-connected winding of Figs. 4 and 5 is wound with six turns in series for each of the six poles, and it utilizes only one conductor for each phase, instead of two conductors in parallel. The connection of the delta-connected winding 61 of Fig. 4 to the rectifier 63 is indicated in Fig. 5.

In the embodiments shown in both Figs. 3 and 5, the generator-rectifier combination 61—63 is adapted to supply rectified current to an auxiliary-load direct-current circuit 70 of the automobile or other transportation-device, through a reverse-current switch 72, which is provided with a series winding 73 and a shunt winding 74. Floating across the direct-current circuit 70 is a storage battery 76.

The exciting winding or field winding 54 of the generator is connected across the rectifier terminals 65 and 66, so as to be substantially linearly responsive to the rectified voltage of the generator-winding 61.

In operation, when the generator is at standstill, the reverse-current switch 72 is in its deenergized open position, and the exciting winding 54 is deenergized, so that the generator excitation is limited to the residual magnetization. When the automobile-engine is started, the generator begins to produce a polyphase electromotive force, due to its residual magnetization, and when its rectified open-circuit voltage reaches a value which is slightly in excess of that of the direct-current circuit 70, the shunt winding 74 of the reverse-current switch 72 picks up the armature 79 and closes the switch, thus causing the rectifier-terminals 65 and 66 to be connected to the direct-current circuit 70. This causes current to flow through the series winding 73 of the reverse-current switch 72, in a direction to assist the shunt coil 74 in holding the switch closed, which condition prevails until the deceleration of the generator causes the rectified output voltage of the generator to fall slightly below that of the direct-current circuit 70, at which time the field current in 54 may be supplied momentarily by the battery 76, rather than by the generator 61, causing a slight momentary reverse-current in the series coil 73, bucking the magnetization of shunt coil 74 and releasing the armature 79 of the switch. From the foregoing, it will be seen that the reverse-current switch 72 operates, in effect, as a device which is responsive to the speed of the battery-charging generator.

It is an important essential characteristic of my generator that it shall be of a fairly high frequency, as compared to ordinary commercial frequencies, such as 60 cycles; and that it shall have a fairly constant-current output-characteristic, when operating at its maximum output, that is, at normal operating speeds, including all speeds above a low cruising speed of the automobile or other transportation-device. At present I regard about 20 miles per hour as being the low cruising speed at which the generator must deliver its full rated rectified current, which, in the present case, is 35 amperes. In fact, the generator shown in Figs. 4 and 5 does a little better than that, and delivers 36.5 amperes at 1000 R. P. M., corresponding to an automobile-speed of approximately 20 miles per hour. The speed-current characteristic of the generator becomes quite flat at higher speeds, so that a 150% increase in speed increases the current only 23%, or to 45 amperes, whereas a 250% increase in speed, corresponding to an automobile-speed of 60 miles per hour, produces only 50 amperes, after which, further increases in speed produce little or no increase in the amperage.

The substantially constant-current characteristic of the generator is obtained by reason of the high frequency of the generator, which means that the effect of the generator-reactance is high, and also by reason of the demagnetizing armature-reaction of the load-currents flowing in the armature-conductors 61 lying in the stator slots 60 (numbered 1 to 39).

In the particular embodiment of my invention shown in Fig. 1, the rotor-member 56 has fifty teeth 58, and since the output-frequency is due to the tooth-pulsations resulting from the fact that the stator-flux passes through the rotor-teeth and becomes nearly zero at the points where there are no rotor-teeth underneath the stator-member, the frequency is equal to the number of rotor-teeth, fifty, times the rotor-speed in revolutions per second, or 50/60 times the rotor-speed in revolutions per minute. At a rotor-speed of 1000 R. P. M., or a low cruising speed of 20 miles per hour, the generator-frequency is 833 cycles.

As previously intimated, a consideration which was of paramount importance in the design of my present generator was the elimination of the excessive noise which heretofore accompanied generators of the inductor-type, operating on tooth-flux pulsations.

One of the first things done, in order to obtain quiet operation, was to so proportion the relative sizes of the stator-teeth and slots that the stator-unit would present a substantially continuous or unbroken pole-face to the rotor, that is, the portion of the stator-member bounding the air-gap 57. This obviously means the utilization of stator-slots which are as narrow as possible. Obviously, the narrowest possible width of stator-slot is a slot which will just barely receive a simple armature-conductor 61, with the necessary insulating cell, insulating the winding. The armature-conductor must be large enough to carry its share of the rated output of the generator, and the current-rating of the conductor may be reduced by connecting one or more conductors in parallel, as has been indicated in the embodiment of my invention shown in Figs. 2 and 3.

It is not desirable to too greatly subdivide the armature-winding, by utilizing a large number of conductors in parallel, because the space-factor then becomes quite objectionable, due to the fact that an excessively large percentage of the entire space of the slots (measured in a circumferential direction) is occupied by the insulating cells rather than by the copper of the winding-conductors.

The effect of narrow stator-slots 60 is to cause the tufts of flux which come out from the ends of the stator-teeth 59 to spread out, by the time they cross the air-gap 57 and reach the top of a rotor-tooth 58, so as to substantially come together and present a fairly uniform intensity of magnetization, thus reducing noise.

To further reduce the noise, it is advantageous to round off the edges of the rotor-teeth, as shown at 81 in Fig. 1, so that the magnetic approach of each rotor-tooth 58 to the stator is smoothed out.

It is also requisite, in noise-reduction, to utilize a large number of stator-teeth, as this raises the pitch or frequency of the noise, and reduces the intensity of the noise which was transmitted through the sound-proofing which is ordinarily embodied in an automobile-body. As previously intimated, the number of teeth 59 which the stator would have, if it extended all the way around the periphery of the rotor, should be sufficiently large to produce a fundamental sound-pitch of 500 vibrations per second, or more, at the lowest operating speed of the generator, corresponding to the idling speed of the prime mover. Thus, with a stator tooth-pitch corresponding to 300 teeth per circumference, as in Fig. 1, the engine speed can be as low as 100 R. P. M. In general, it will be found that the number of stator-teeth per circumference, that is, the number of teeth which the stator would have if its span were increased to include the entire circumference of the rotor, should be at least 210, and preferably much more.

The stator tooth-pitch should be small, even to the extent, sometimes, of subdividing the conductor so as to utilize parallel-connected conductors or coils, in order to obtain the requisite current-carrying capacity. This stator tooth-pitch should be of the order of 0.21 inch, or less, and it may be as small as 0.10 inch, or even less, without running into too great difficulty in the way of reduced space-factor resulting from the relatively greater proportion of the slot-space occupied by insulation when the slot-width, and hence the conductor-size is greatly reduced.

The electrical conditions are better when the number of rotor teeth is as large as other considerations will readily permit. Since the number of stator-teeth per circumference is limited— by the necessity for having an adequate slot-width for a single conductor with its insulation, and an adequate tooth-width to carry a reasonable flux,—the number of rotor-teeth should, in general, be as large as possible, for any given stator tooth-pitch,—and this, in general, fixes the rotor tooth-pitch as approximately 2N times the stator tooth-pitch, N being the number of phases and being greater than two in any polyphase generator, because a two-phase circuit is in reality a four-phase circuit, as is well understood. The factor 2 is involved because a single-layer, approximately full-pitch stator-winding 61 is utilized.

A rotor tooth-number of fifty is, in general, sufficiently large, both from a standpoint of electrical efficiency and from a standpoint of noise-reduction, particularly in a generator in which the normal operating-speed is of the order of 1000 R. P. M. The number of rotor-teeth may be increased beyond fifty, say to seventy or more, without encountering any difficulties due to noise, but any attempt to reduce the number of rotor-teeth very much below fifty, say, below about thirty-five teeth, would cause the design to begin to run into difficulties.

The reduction in noise by the foregoing means finally reached a point where there was an amount of noise which was still objectionable, and which could not be eliminated by any of the foregoing means. This noise was finally identified as coming principally from the pulsating retarding torque due to the load on the generator, because of the fact that the generator which was previously utilized was of a single-phase design. When the design was changed to a two-phase generator, this noise, which was discovered to be due to the pulsating load-torque, was very much reduced, because of the fact that the load-torque of a two-phase generator is almost free of pulsations. This effect was enhanced by the utilization of three phases, in which case the load-torque pulsations are substantially entirely eliminated.

It is believed that the noise-difficulties due to the pulsating load-torque in the previous single-phase designs are a phenomenon which is peculiar to a small-span stator-design, and are not encountered in ordinary single-phase generators in which an armature-winding extends all of the way around the machine. By reason of the fact that a small-span stator-member has been utilized, extending over only a very small part of the circumference of the rotor-member, the pulsations in the reactions due to the single-phase load have resulted in unbalanced lateral or radial pulls between the stator and rotor elements, resulting in noise which would not have been obtained if the stator-element had extended all of the way around the rotor element, or if the small-span stator-element had been exactly balanced by a similar corresponding stator-element arranged exactly diametrically opposite the same, on the other side of the rotor-element.

As previously intimated it is desirable to taperingly increase the air-gap 57, for the last few stator-teeth 59, at each end of the stator-member 58, which is accomplished by cutting back the last three stator-teeth 59 in a straight line, as indicated at 83 in Fig. 1. By this means, I substantially avoid the flux-variations which would be caused by changing from six rotor-teeth to seven rotor-teeth under the stator-member, in different positions of the rotor-member.

Another very important object of my invention was the increasing of the amount of electrical output which could be obtained from a stator-element of a given size, or a reduction of the size, for any given output. I have discovered that the output of each phase of the winding is almost or substantially the same as the output which would be obtained if only a single phase had been utilized for the winding, so that the output was substantially trebled over the single-phase design, by the utilization of a three-phase winding. This made it possible to somewhat increase the rating of the generator, and also to materially reduce the ampere turns which were utilized in the field-winding 54, the latter reduction being quite advantageous in increasing the life of the contacts of the regulator (not shown) which is a standard part of the equipment of automobile battery-charging systems for preventing serious overcharging of the battery.

It is evident that there are practical limits within which the design of a satisfactory noise-proof high-frequency small-span generator may be carried out. Some of these limits have already been indicated, and some limits may be indicated as follows, although it is probably not necessary to observe all of the limits at all times, these limits being merely desirable from the standpoint of obtaining the best design possible, with the particular speeds and rotor-size which have heretofore been contemplated in the application of my design.

I believe that the electrical frequency, at the minimum normal operating-speed, corresponding to a low cruising speed of the transportation-device, should be of the order of 800 cycles or complete alternations per second, by which expression I contemplate a frequency varying between about 500 cycles and about 1500 cycles or more. I believe that the minimum frequency of the generator, at the idling speed of the prime mover, should be over 60 cycles. I believe that the number of rotor-teeth should be advantageously kept to a value of the order of 50, by which expression I contemplate a variation between about 35 teeth and about 70 teeth or more. As another way of arriving at a satisfactory design, I believe that the chordal stator tooth-pitch should be of the order of .14 inch, by which expression I contemplate a variation from about 0.10 inch, or less, to about 0.21 inch, as a maximum limit. The rotor tooth-pitch may be determined from the foregoing, by the requirement that it shall be approximately 2N times the stator tooth-pitch.

Figure 6:
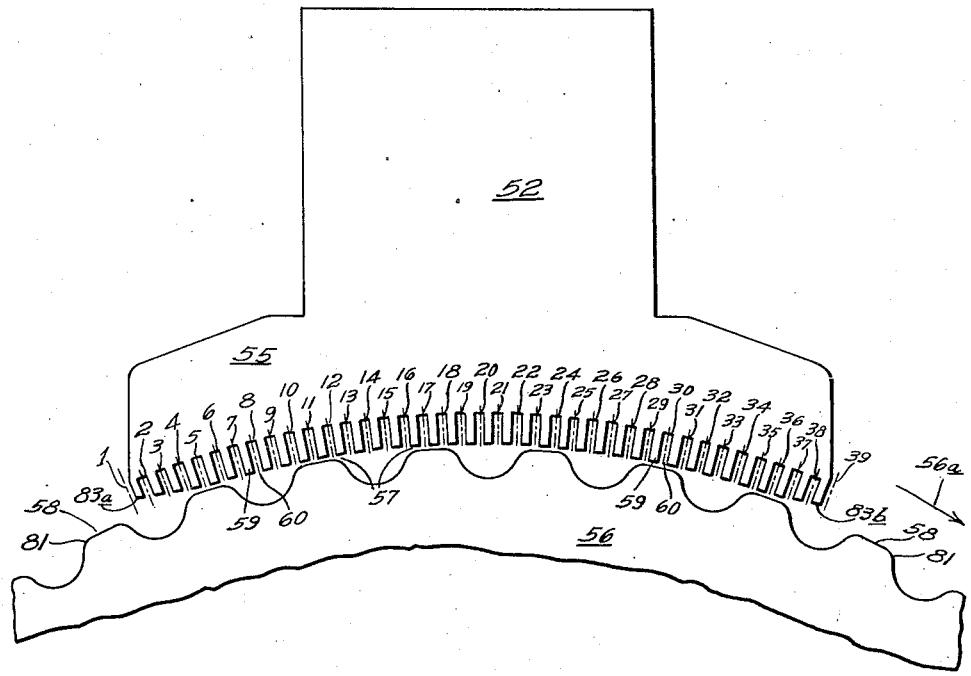
Fig. 6 is a diagrammatic structural view illustrating a modification of the structure shown in Fig. 1.

In Fig. 6, I have shown a modification of my invention in which the stator member 52 has the same number of teeth 59 and slots 60 as in Fig. 1, but the span of the stator member has been decreased by about one stator tooth-pitch, as compared to the construction shown in Fig. 1, so that the rotor tooth-pitch is somewhat more than 2N times the stator tooth-pitch. The result of this construction is that the impacts of the rotor teeth 58, as they come under successive stator teeth 59, are staggered with reference to each other, so that the fundamental pitch of the noise is reduced, at the expense of introducing a weak high-harmonic sound-note which is substantially damped out and is not objectionable.

The electrical result of the slight reduction in the stator tooth-pitch, shown in Fig. 6, as compared to that which is shown in Fig. 1, is that there is an electrical phase-difference between the voltages generated in the successive serially connected conductors, such as those bottom conductors 61 which are connected in phase-A in Fig. 2. This results in a slight reduction in the overall voltage, and constitutes the price which must be paid for reducing the noise by changing the tooth-pitch ratio from exactly 2N:1.

A further expedient for reducing the noise, as illustrated in Fig. 6, is to have the trailing tip 83a of the stator-member 52 cut back further than the leading tip 83b, the direction of rotation being assumed to be clockwise, as indicated by the arrow 56a. This results in a slight increase of the air-gap 57 on the trailing end, resulting in a diminution in the noise according to my experience.

Figure 7:
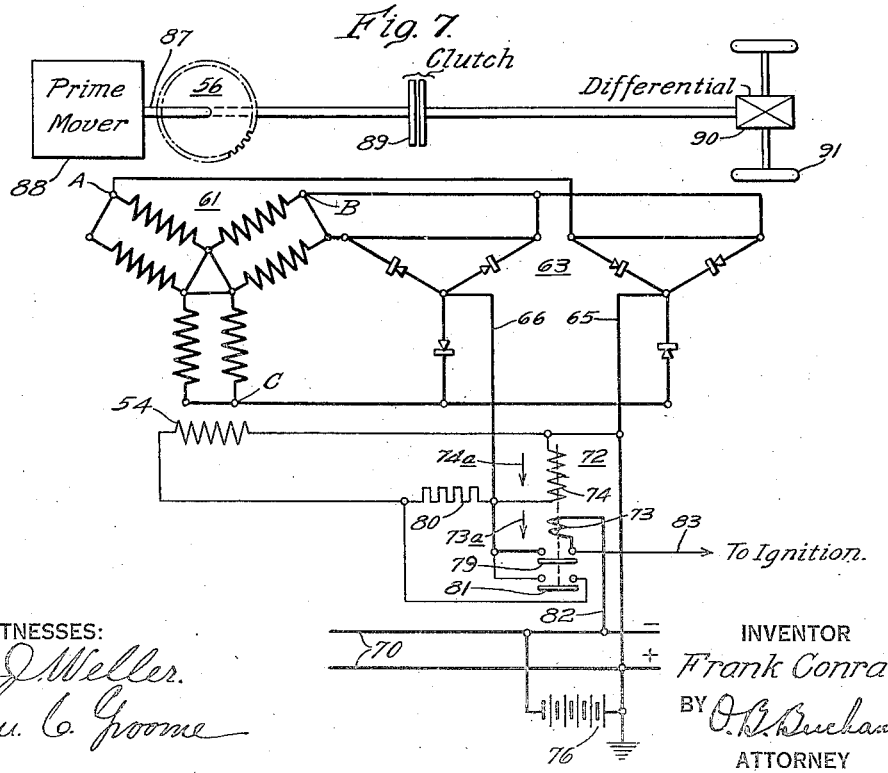
Fig. 7 is a diagrammatic view of circuits and apparatus illustrating a modification of the circuits and apparatus shown in Fig. 3.

Figure 7 illustrates a further expedient which I have sometimes found useful for reducing noise, where necessary. This expedient consists in having a resistor 80 in circuit with the generator field-winding 54, and adding a second or auxiliary contact 81 to the reverse-current relay 72, in addition to the main relay-contact 79. The reverse-current relay 72 is so connected that, when the main contact 79 closes, as a result of the generator-voltage becoming slightly higher than the voltage of the battery 76, the auxiliary contact 81 also closes and short-circuits the field-resistor 80, thereby restoring the generator operating-conditions to full field-strength. The electrical result of this field-circuit control, as shown in Fig. 7, is that the reverse-current relay 72 does not pick up and close its main contacts 79, to connect the generator to the battery 76, until the generator has attained a somewhat higher speed than in the embodiment of my invention shown in Fig. 3. However, since the automobiles on which my invention is primarily utilized usually accelerate promptly to speeds beyond the speed at which the generator charges the battery, in the Fig. 7 system, no substantial charging-time is lost by this slight delay in bringing the charging-action of the generator into operation.

When the generator is operating at a speed high enough to be charging the battery 76, in the system shown in Fig. 7, and the generator speed reduces to a point enabling the reverse-current relay 72 to drop out, the auxiliary relay-contact 81 also opens and inserts the field-resistor 80 in series with the field-winding 54, resulting in a materially reduced excitation of the generator, and hence resulting in a materially reduced noise. This reduction in the noise is thus obtained during the slow running-conditions of the generator, corresponding to idling conditions of the prime-mover of the automobile. This noise-reduction at this particular time is particularly advantageous because that is the time when the noise is usually the most objectionable, as hereinabove pointed out.

Fig. 7 also shows a slight alteration in the electrical connections of the reverse-current relay 72, resulting in somewhat better performance. In this embodiment of my invention, the series coil 73 of the relay is connected in the lead 82 which extends between the main relay-contact 79 and the negative conductor (—) of the direct-current circuit 70, as distinguished from the Fig. 3 connection, wherein the series coil 73 is connected in the lead 66 between the main relay-contact 79 and the rectifier 63. Also, in Fig. 7, a portion of the direct-current load which is normally fed from the battery-circuit 70 is drawn through the relay current-coil 73, as shown by the conductor 83 of the ignition-circuit, said conductor 83 being connected to the negative conductor (—) of the direct-current circuit 70 through the series coil 73 and the conductor 82.

The result of this ignition-circuit connection 83, in the system shown in Fig. 7, is that, when the generator is charging the battery 76, and the generator-speed drops to the point where the generator supplies less current than that required to energize the ignition-circuit, the current in the series coil 73 changes from a charging-direction, as shown by the arrow 73a to the reverse direction, as the ignition-load is taken over by the battery 76, thus causing the current-direction in the series coil 73 to buck the current-direction 74a in the shunt coil 74, causing the reverse-current relay to promptly drop out and open its main and auxiliary contacts 79 and 81.

Fig. 7 also shows the essential relationships between the polyphase generator and the driving-equipment of the automobile or other self-propelled transportation device on which my invention is utilized. The toothed rotor-wheel 56 is shown mounted on the shaft 87 of the prime-mover 88, between the prime-mover 88 and the clutch 89, said clutch 89 being disposed, in turn, between the prime-mover 88 and the differential mechanism 90 which drives the wheels 91. During idling of the prime-mover 88, when the generator is operating at its lowest speed, and is prone to develop objectionable noises, the clutch 89 is usually declutched so that the driving-connection between the prime-mover 88 and the wheels 99 is interrupted. Under these conditions, my field-resistor 80, for reducing the excitation of the generator-field 54, is frequently quite desirable, particularly in installations in which the maximum possible output must be obtained from the generator.

While I have illustrated my invention in several different structural embodiments, and while I have indicated the ranges of the design-limitations which I at present believe to be desirable, I wish it to be distinctly understood that my invention, in its broader aspects, is not limited to any particular design or to any particular exact quantitative limits, an essential feature of my invention, in its broadest aspects, being the utilization of a small-span polyphase high-frequency generator cooperating with a toothed rotor-element, either considered alone or in combination with an automobile battery-charging system, which I consider to be a novel and extremely useful and fundamental step forward in the art of automobile battery-charging. I wish it to be understood that my invention is susceptible of embodiment in various different forms, and that changes may be introduced in the illustrated forms of embodiment, without departing from the essential spirit and principles of my invention, particularly in its broader aspects. I desire, therefore, that the appended claims shall be accorded the broadest construction consistent with their language and the prior art.

I claim as my invention:

1. In a self-propelled transportation-device, a variable-speed prime mover, and propelling-means energized from said prime mover, a commercially practicable combination including means for converting only a small portion of the prime-mover output into electrical energy, said means comprising a wheel carried by the prime-mover shaft and having a diameter corresponding approximately to a diameter suitable for a flywheel for said prime mover, said wheel having an annular toothed portion of magnetizable material, a casing substantially enclosing said wheel, said casing having a small portion thereof bulging away from said wheel, a relatively small salient-pole stator-member mounted in said bulged portion of the casing, said stator-member spanning much less than the entire periphery of said annular toothed wheel-portion, magnetizing means associated with said stator-member, said stator-member having a portion thereof spaced from the annular toothed wheel-portion by an air gap, said portion of the stator-member being of magnetizable material and having teeth spaced approximately 2N times closer together than the wheel-teeth, N being an integer larger than 2, an N-phase winding-means so disposed on the stator-teeth as to produce N-phase voltages dependent upon tooth-flux pulsations, the slots between the stator-teeth being only wide enough for a single winding-conductor with the necessary insulation, the stator tooth-pitch being between 0.10 inch and 0.21 inch, the number of wheel-teeth being at least 35, a rectifying-means associated with said N-phase winding-means, and an auxiliary-service direct-current circuit for receiving the output of said rectifying-means, said direct-current circuit including a floating storage battery.

2. In a battery-charging system for use on a variable-speed transportation device, said battery-charging system comprising an auxiliary-service direct-current circuit for other than propulsion-power purposes, said direct-current circuit including a floating storage battery, in combination with a polyphase circuit and a rectifying-means for supplying current from said polyphase circuit to said direct-current circuit, a novel polyphase inductor-type generator for said polyphase circuit, comprising a relatively large variable-speed driven wheel having an annular toothed portion of magnetizable material, a relatively small stator-member spanning much less than the entire periphery of said annular toothed wheel-portion, magnetizing means associated with said stator-member, said stator-member having a portion thereof spaced from the annular toothed wheel-portion by an air gap, said portion of the stator-member being of magnetizable material and having teeth closer together than the wheel-teeth and so spaced, circumferentially, relative to said wheel-teeth, as to produce high-frequency tooth-flux pulsations, a polyphase winding-means so disposed on said stator-teeth as to produce polyphase voltages dependent upon said tooth-flux pulsations, the slots between the stator-teeth being only wide enough for a single winding-conductor with the necessary insulation, the stator tooth-pitch being of the order of 0.21 inch or less, the number of wheel-teeth being at least 35.

3. In a battery-charging system for use on a variable-speed transportation-device, the combination, with a storage-battery circuit and a polyphase rectifier for charging the battery, of a polyphase inductor-type generator comprising a relatively large variable-speed driven wheel having an annular toothed portion of magnetizable material, a relatively small stator-member spanning much less than the entire periphery of said annular toothed wheel-portion, magnetizing means associated with said stator-member, said stator-member having a portion thereof spaced from the annular toothed wheel-portion by an air gap, said portion of the stator-member being of magnetizable material and having teeth closer together than the wheel-teeth and so spaced, circumferentially, relative to said wheel-teeth, as to produce high-frequency tooth-flux pulsations, a polyphase winding-means so disposed on said stator-teeth as to produce polyphase voltages dependent upon said tooth-flux pulsations, the stator teeth being spaced closely together at least as closely as if the stator spanned the whole circumference of said toothed wheel-portion and had at least 210 teeth in said whole circumference, the slots between the stator-teeth being only wide enough for a single winding-conductor with the necessary insulation, the number of wheel-teeth being at least 35.

4. In a battery-charging system for use on a variable-speed transportation-device, the combination, with a storage-battery circuit and a polyphase rectifier for charging the battery, of a polyphase inductor-type generator comprising a relatively large variable-speed driven wheel having an annular toothed portion of magnetizable material, a relatively small stator-member spanning much less than the entire periphery of said annular toothed wheel-portion, magnetizing means associated with said stator-member, said stator-member having a portion thereof spaced from the annular toothed wheel-portion by an air gap, said portion of the stator-member being of magnetizable material and having teeth spaced approximately 2N times closer together than the wheel-teeth, N being the number of phases of the polyphase circuit and generator, an N-phase winding-means so disposed on said stator-teeth as to produce N-phase voltages dependent upon tooth-flux pulsations, the stator-pitch being of the order of 0.21 inch or less.

5. The invention as defined in claim 4, characterized by the small-span stator-member being so shaped and disposed, with reference to the toothed wheel-portion, that the air-gap is gradually increased at each end of the small-span stator-member.

6. The invention as defined in claim 4, characterized by the small-span stator-member being so shaped and disposed, with reference to the toothed wheel-portion, that the air-gap is gradually increased at each end of the small-span stator-member, the air-gap being somewhat larger on the trailing end of the stator-member as compared to the leading end.

7. In a battery-charging system for use on a variable-speed transportation-device, the combination, with a storage-battery circuit and a polyphase rectifier for charging the battery, of a polyphase inductor-type generator comprising a relatively large variable-speed driven wheel having an annular toothed portion of magnetizable material, a relatively small stator-member spanning much less than the entire periphery of said annular toothed wheel-portion, magnetizing means associated with said stator-member, said stator-member having a portion thereof spaced from the annular toothed wheel-portion by an air gap, said portion of the stator-member being of magnetizable material and having teeth closer together than the wheel-teeth and so spaced, circumferentially, relative to said wheel-teeth, as to produce high-frequency tooth-flux pulsations, a polyphase winding-means so disposed on said stator-teeth as to produce polyphase voltages dependent upon said tooth-flux pulsations, the stator teeth being spaced approximately 2N times more closely together than the wheel-teeth, N being the number of phases of the polyphase circuit and generator, the slots between the stator teeth being only wide enough for a single winding-conductor with the necessary insulation, the small-span stator-member being so shaped and disposed, with reference to the toothed wheel-portion, that the air-gap is gradually increased at each end of the small-span stator-member, and the wheel-teeth being well rounded.

8. A battery-charging device for use on a self-propelled transportation-device equipped with a variable-speed prime mover, and engageable and disengageable propelling-means adapted to be energized and freed from said prime mover, said battery-charging device comprising an auxiliary-service direct-current circuit for other than propulsion-power purposes, said direct-current circuit including a floating storage battery, in combination with a polyphase circuit and a rectifying-means for supplying current from said polyphase circuit to said direct-current circuit, said polyphase circuit being characterized by including a novel polyphase inductor-type generator comprising a toothed rotor-member driven from said prime-mover, and a toothed stator-member separated from said toothed rotor-member by an air-gap and spanning less than the entire periphery of said rotor-member, the stator-teeth being small relatively to the rotor-teeth and being closer together than the rotor-teeth in a relation suitable for producing tooth-flux pulsations in the stator-teeth, a polyphase winding associated with said stator-teeth for responding to said tooth-flux pulsations, the stator-teeth being so close together, relative to the rotor-tooth pitch, that the fundamental sound-pitch lies somewhere in the region of 500 cycles per second, or more, at a predetermined idling speed of the prime mover, and the number of rotor-teeth being sufficient to produce an electrical frequency of the order of 600 cycles, or more, at a low cruising-speed of the transportation device, said idling speed being a speed at which the generator is incapable of charging the battery, and said low cruising-speed being a speed at which the generator is capable of delivering a substantial charging-current.

9. The invention as defined in claim 1, characterized by the ratio of the wheel tooth-pitch to the stator tooth-pitch being slightly different from 2N, and the stator-conductors of each of the several N phases, in different portions of the stator-span, being serially connected together, whereby there is an appreciable electrical phase-difference between the induced voltage in a stator-conductor near one end of the stator-span and the induced voltage in a serially connected stator-conductor near the other end of the stator-span, and whereby the intensity of the fundamental sound-note is decreased.

10. The invention as defined in claim 2, characterized by such relative spacings of the stator-teeth and the wheel-teeth that the successive tooth-flux pulsations corresponding to the same electrical phase are slightly out of phase with each other.

11. The invention as defined in claim 3, characterized by such relative spacings of the stator-teeth and the wheel-teeth that the successive tooth-flux pulsations corresponding to the same electrical phase are slightly out of phase with each other.

12. In a battery-charging system for use on a variable-speed transportation-device, the combination, with a storage-battery circuit and a polyphase rectifier for charging the battery, of a polyphase inductor-type generator comprising a relatively large variable-speed driven wheel having an annular toothed portion of magnetizable material, a relatively small stator-member spanning much less than the entire periphery of said annular toothed wheel-portion, magnetizing means associated with said stator-member, said stator-member having a portion thereof spaced from the annular toothed wheel-portion by an air gap, said portion of the stator-member being of magnetizable material and having teeth spaced slightly different from 2N times more closely together than the wheel-teeth, N being the number of phases of the polyphase circuit and generator, an N-phase winding-means so disposed on said stator-teeth as to produce N-phase voltages dependent upon tooth-flux pulsations, the stator-pitch being of the order of 0.21 inch or less.

13. The invention as defined in claim 8, characterized by such relative spacings of the stator-teeth and the rotor-teeth that the successive tooth-flux pulsations corresponding to the same electrical phase are slightly out of phase with each other.

14. In a battery-charging system for use on a variable-speed transportation-device, the combination, with a storage-battery circuit, a variable-speed alternating-current generator, and a rectifier-means for charging the battery from said generator, said generator being a high-frequency inductor generator having a tendency to produce a disagreeable hum, of field-circuit means for exciting the generator, generator-voltage-responsive means for, at times, connecting the generator, through the rectifier-means, to the battery and also decreasing the resistance of the field-circuit of the generator, and means responsive to the relative electrical conditions of the generator and the battery for, at other times, disconnecting the generator from the battery and increasing the resistance of the field-circuit of the generator.

15. In a battery-charging system for use on a variable-speed transportation-device, the combination, with a storage-battery circuit, a variable-speed alternating-current generator, and a rectifier-means for charging the battery from said generator, of field circuit means for self-exciting the generator from the direct-current terminals of the rectifier-means, and generator-voltage-responsive means for connecting said direct-current rectifier-terminals to the battery and also decreasing the resistance of the field-circuit of the generator, said relay-means being further operative, on falling generator-voltages, to disconnect the direct-current rectifier-terminals from the battery and to increase the resistance of the field-circuit of the generator.

16. In a battery-charging system for use on a variable-speed transportation-device, the combination, with a storage-battery circuit, a variable-speed alternating-current generator, and a rectifier-means for charging the battery from said generator, of field-circuit means for self-exciting the generator from the direct-current terminals of the rectifier-means, a serially connected resistor connected in said field-circuit means, a reverse-current relay having a main contact, an auxiliary contact, a shunt coil and a series coil, means for connecting said auxiliary contact across said field-circuit resistor, an auxiliary load-circuit conductor, means for connecting said series coil between a terminal of the storage-battery circuit and said auxiliary load-circuit conductor, means for connecting said main contact between said auxiliary load-circuit conductor and a direct-current terminal of the rectifier-means, and means for energizing said shunt coil from the direct-current terminals of said rectifier-means.

17. In a battery-charging system for use on a variable-speed transportation-device, the combination, with a load-circuit having a storage-battery floating thereacross, a variable-speed alternating-current generator, and a rectifier-means for charging the battery from said generator, of a reverse-current relay having a main contact, a shunt coil and a series coil, an auxiliary load-circuit conductor, a load connected to said auxiliary load-circuit conductor at least whenever the generator is functioning in its normal operation, means for connecting said series coil between a terminal of the storage-battery circuit and said auxiliary load-circuit conductor, means for connecting said main contact between said auxiliary load-circuit conductor and a direct-current terminal of the rectifier-means, and means for energizing said shunt coil from the direct-current terminals of said rectifier-means.

FRANK CONRAD.